United States Patent
Verma (10) Patent No.: US 7,593,352 B2
(45) Date of Patent: Sep. 22, 2009

(54) DISCOVERING MPLS VPN SERVICES IN A NETWORK

(75) Inventor: Alok Verma, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 489 days.

(21) Appl. No.: 11/446,486

(22) Filed: Jun. 2, 2006

(65) Prior Publication Data

US 2007/0280241 A1 Dec. 6, 2007

(51) Int. Cl.
*H04L 12/28* (2006.01)
*H04L 12/56* (2006.01)

(52) U.S. Cl. ................ 370/255; 370/392; 370/401

(58) Field of Classification Search ........ 370/252, 370/254, 255, 389, 392, 395.31, 400, 401
See application file for complete search history.

(56) References Cited

U.S. PATENT DOCUMENTS

| | | | |
|---|---|---|---|
| 7,075,933 B2 | 7/2006 | Aysan | |
| 7,116,665 B2 * | 10/2006 | Balay et al. | 370/392 |
| 7,400,611 B2 * | 7/2008 | Mukherjee et al. | 370/338 |
| 2002/0181477 A1 * | 12/2002 | Mo et al. | 370/401 |
| 2004/0174879 A1 * | 9/2004 | Basso et al. | 370/392 |
| 2005/0025069 A1 | 2/2005 | Aysan | |
| 2005/0091482 A1 | 4/2005 | Gray et al. | |
| 2005/0286441 A1 * | 12/2005 | Huang | 370/254 |
| 2006/0002401 A1 * | 1/2006 | Mukherjee et al. | 370/401 |
| 2006/0072589 A1 * | 4/2006 | Mandavilli et al. | 370/400 |
| 2006/0182037 A1 | 8/2006 | Chen et al. | |
| 2006/0215578 A1 * | 9/2006 | Andrapalliyal et al. | 370/254 |
| 2007/0226325 A1 * | 9/2007 | Bawa et al. | 709/223 |

* cited by examiner

*Primary Examiner*—Hong Cho
(74) *Attorney, Agent, or Firm*—Hickman Palermo Truong & Becker LLP (57) ABSTRACT

Discovering a network service topology of a virtual private network (VPN) that uses multiprotocol label switching (MPLS) comprises receiving route target values from a virtual private network (VPN) route forwarding table (VRF table) of a networking device; determining and storing in a table one or more link pairs based on the route target values, wherein each of the link pairs indicates a connection between a first site and a second site within the VPN; creating a set of VPN objects based on an association between a first VPN object and the one or more link pairs stored in the table, wherein each of the VPN objects includes information indicating connectivity between a subset of sites from a plurality of sites within the VPN; and determining the topology for the first VPN object based on applying one or more topology rules to the subset of sites within the first VPN object.

45 Claims, 8 Drawing Sheets

DISCOVERING MPLS VPN SERVICES IN A NETWORK

FIELD OF INVENTION

The present invention generally relates to Network Management Systems (NMS) involving Virtual Private Networks (VPNs) in telecommunications. The invention relates more specifically to discovery of Multiprotocol Label Switching (MPLS) based VPN topologies in a network.

BACKGROUND OF THE INVENTION

A Virtual Private Network (VPN) uses Service Provider network (SP) as a transport foundation to establish secure network communication links. VPN technology uses SP network to provide the appearance of a private network linking business partners, regional and isolated offices of an enterprise, or other users. A VPN can significantly decrease the cost of providing secure communications among a mobile workforce, and can mimic leased-line private network access. The effects of VPNs on organizations employing them have been dramatic: sales have increased; product development has accelerated; and strategic partnerships have strengthened in ways never before possible. Since access to VPN entry points is generally available locally, VPNs offer a less expensive alternative to dedicated remote access connections.

In general, a VPN is implemented by communicatively coupling a plurality of routers, switches, gateways, and firewalls in one or more local area networks, wide area networks, or internetworks using secure tunneling protocols. End stations such as personal computers, workstations, servers, printers, and IP phones are communicatively coupled to the network devices. Although the internetwork infrastructure is public, the end stations are generally associated with one or more unrelated organizations. To prevent a second organization from receiving and using information transmitted from a first organization, a router at an edge of the first organization's network typically encrypts and specially treats outbound requests. The outbound requests then pass through devices within the network and through any related networks as if they were normal (non-VPN) traffic. Requests can enter a particular destination local area network only if the VPN traffic is associated with that destination network. If not, the request is recognized as outside the VPN and blocked or dropped.

Multiprotocol Label Switching (MPLS)-based VPNs are defined in RFC 2547bis, published by the Internet Engineering Task Force (IETF) L3VPN working group. The RFC defines the use of the BGP interdomain routing protocol for distributing VPN labels. An internal BGP session is established between two edge routers, such as two provider edge routers of a network service provider. Label Distribution Protocol (LDP) is used to distribute MPLS labels to routers and switches in the core of the service provider network. In the edge routers, VPN routing and forwarding (VRF) instances, also termed VRF tables, are derived from the global routing tables which reside in each router. One VRF is assigned to each subscriber connecting to SP network at a particular site. Since there are multiple VRFs and one global routing table, a service provider can offer a VPN service as well as Internet service over the same connection. When traffic arrives on a VPN, the forwarding decision is made according to the associated VRF. Non-VPN traffic is routed using the global routing table.

Network administrators may use router and switch configuration commands to establish MPLS VPN configurations at routers and switches at different times. When a Network Management System (NMS) is used to manage the network, the NMS may not have information specifying which routers and switches were configured with MPLS VPNs before the NMS began operating. Thus, providing techniques for effective discovery of existing MPLS VPN services that are configured in a network is a challenge in the design of an NMS. Managing such networks requires discovery of the MPLS VPN services that have been configured in the past or using other tools, and bringing information about the services into the NMS database. However, past approaches do not provide a solution for this issue.

For example, one prior approach proposes a mechanism that enables a tag-switching router (TSR) to discover potential tag distribution protocol (TDP) peers. To engage in discovery on an interface a TSR periodically sends TDP Link Hello messages out the interface. TDP Link Hellos are sent as UDP packets addressed to the well-known TDP discovery port for the "all routers" group multicast address. Responses to the Link Hello provide TDP peer identifying information. However, significant problems with this approach occur when the TDP peers are in VPNs, because the identifying information may use private addresses that overlap across multiple VPNs of different entities. Thus, the identifying information does not accurately indicate what peers are involved in the VPNs.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Techniques for discovering Multiprotocol Label Switching (MPLS) based Virtual Private Networks (VPNs) are described. "Discovery" generally refers to determining a network topology and information about networking devices that are involved in MPLS-based VPNs. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

For purposes of illustrating clear examples, certain embodiments herein are described with reference to VPNs that are established for customers of a network service provider (SP). However, the techniques herein can be practiced in any network environment in which at least one MPLS VPN is configured and are not limited to use with SP networks or arrangements between an SP and its customers.

Embodiments are described herein in sections according to the following outline:

1.0 MULTIPROTOCOL LABEL SWITCHING VIRTUAL PRIVATE NETWORKS
2.0 STRUCTURAL AND FUNCTIONAL OVERVIEW
2.1 GENERAL OVERVIEW
2.2 DEVICE MODEL AND SERVICE MODEL
2.3 SERVICE PROVIDER NETWORK CONFIGURATIONS
2.4 DISCOVERING AN MPLS VPN TOPOLOGY
3.0 HARDWARE OVERVIEW 1.0 MultiProtocol Label Switching Virtual Private Networks MPLS VPNs are described in RFC 2547bis. A VPN is defined in a router or switch by a collection of policies that control connectivity among a set of sites. A customer site is connected to a service provider network by one or more ports of a networking device, and the service provider associates each port with a VPN routing table in the networking device. A VPN routing table is termed a VPN routing and forwarding (VRF) table.

Figure 1:
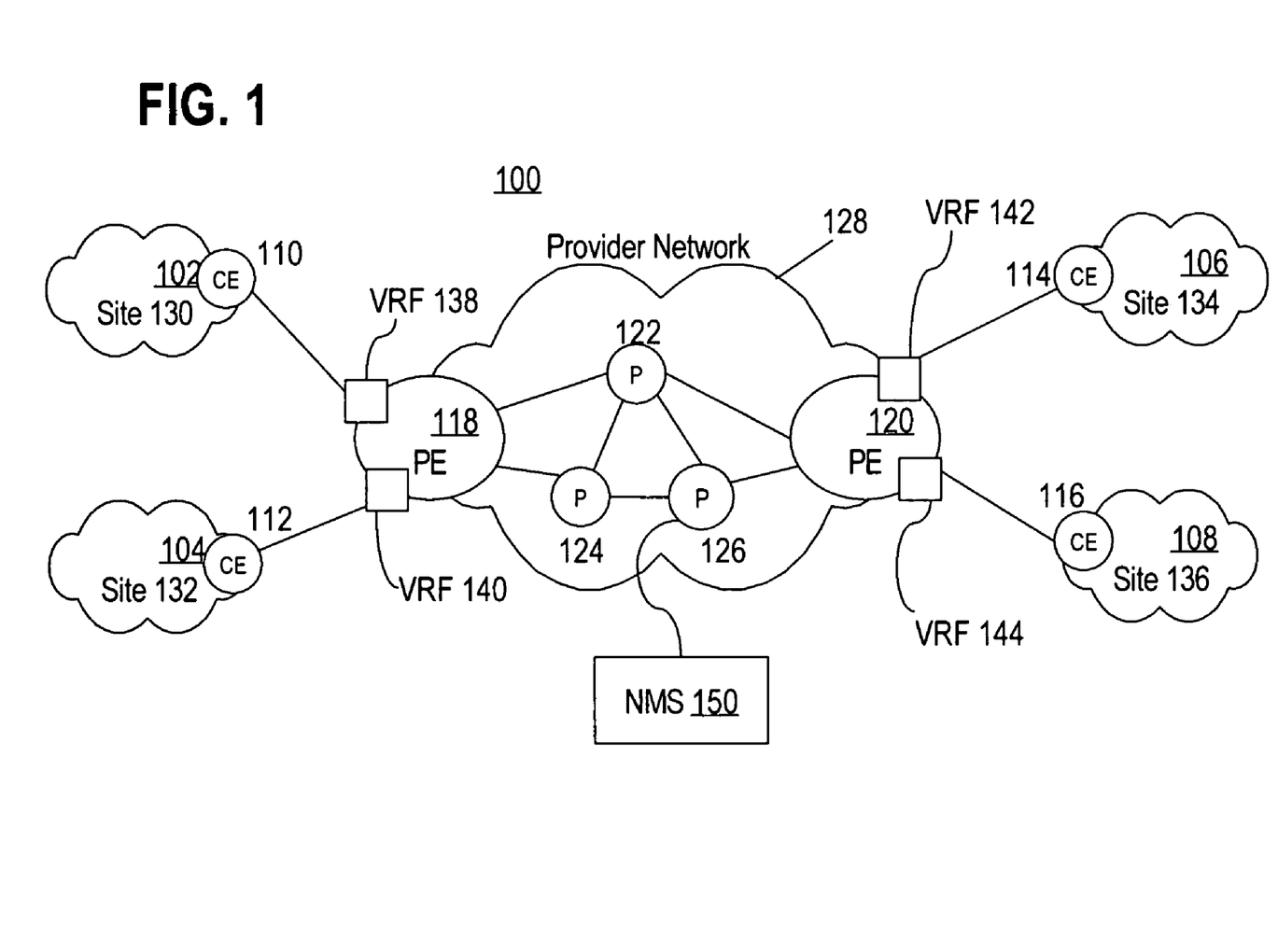
FIG. 1 is a simplified block diagram of a Multiprotocol Label Switching Virtual Private Network.

FIG. 1 is a simplified block diagram of an MPLS VPN in an SP network environment. Customer Edge (CE) networking devices 110, 112, 114 and 116, which comprise routers or switches, provide SP customers with access to the SP network over data links to Provider Edge (PE) routers 118, 120. In a typical implementation the CE devices 110, 112, 114, 116 are IP routers that run BGP or any other routing protocol. Under BGP, each of the CE devices establishes a BGP adjacency relationship under a BGP session with PE routers 118, 120. Once the adjacency is established, using BGP the CE devices 110, 112, 114, 116 advertise the identity of local VPN routes to the PE routers 118, 120 and discover remote VPN routes from the PE routers 118, 120. Thus, the routers in FIG. 1 exchange reachability information under BGP.

The PE routers 118, 120 also exchange static routing table information with the CE devices 110, 112, 114, 116. PE routers 118, 120 maintain VPN routing information. However, each PE router 118, 120 is only required to maintain VPN routes for those VPNs to which it is directly attached. Each PE router 118, 120 maintains a VRF table for each of its directly connected sites 130, 132, 134 and 136. Each customer connected to the sites 130, 132, 134 and 136 is mapped to a specific VRF. For example, in FIG. 1 site 130 is mapped to VRF 138 located in PE 118, site 132 is mapped to VRF 140 located in PE 118, site 134 is mapped to VRF 142 located in PE 120, and site 136 is mapped to VRF 144 located in PE 120.

Once the local VPN routes from CE devices 110, 112, 114, 116 have been discovered, PE routers 118, 120 exchange VPN routing information with the other PE routers using a protocol such as IBGP. When using MPLS to forward VPN data traffic from site 130 across the provider's network 128, the ingress PE router 118 functions as the ingress label switched router (LSR), and the egress PE router 120 functions as the egress LSR.

Provider routers 122, 124, 126 are routers in the provider's network 128 that are not attached to any CE devices 110, 112, 114, 116. The provider routers 122, 124, and 126 functions as MPLS transit LSRs when forwarding VPN data traffic between PE routers 118, 120. Provider routers 122, 124, 126 are only required to maintain routes to the provider's PE routers 118, 120 and not specific VPN routing information for each customer site 130, 132, 134, 136.

Figure 4:
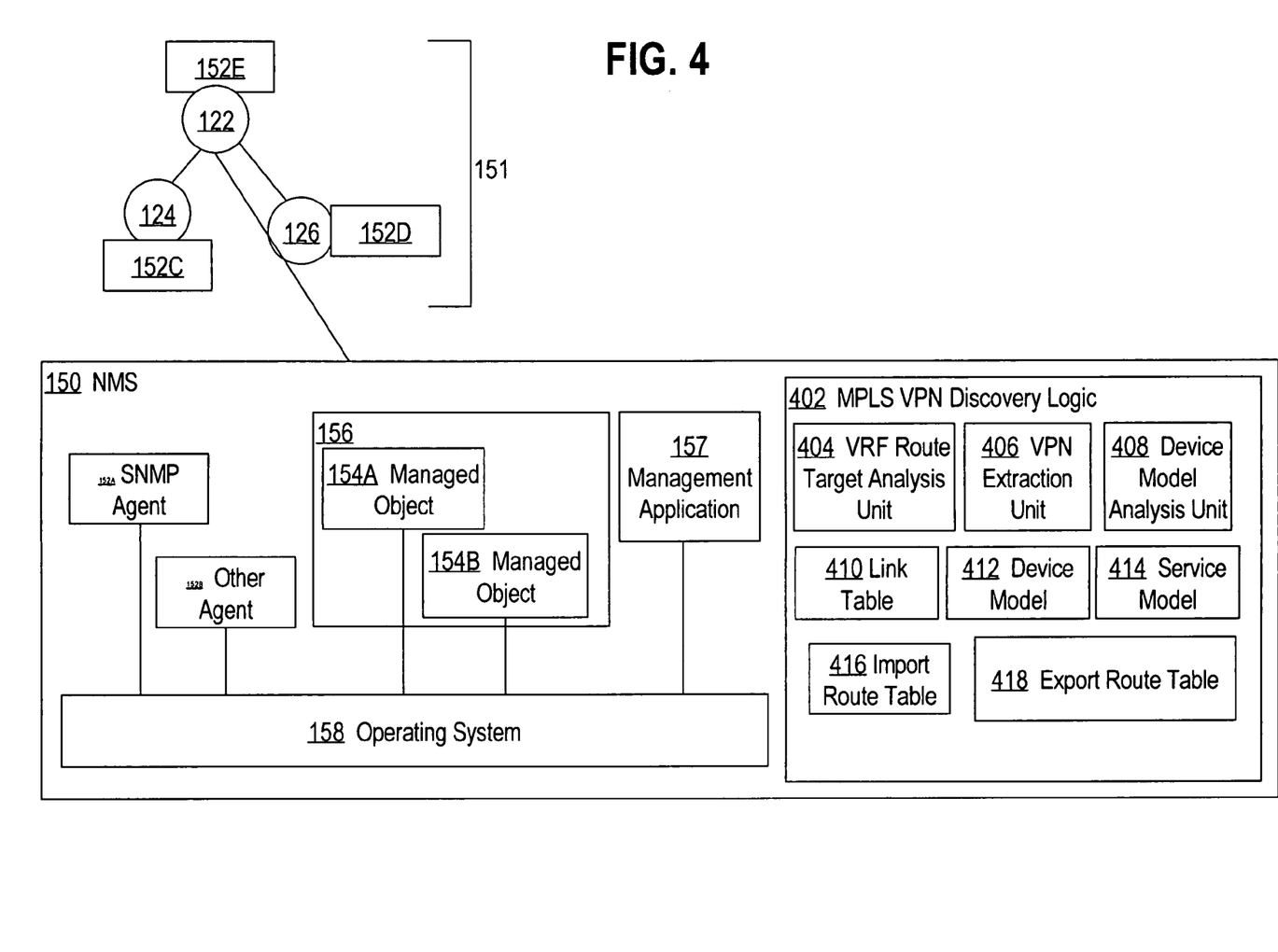
FIG. 4 is a block diagram of an example software architecture of an example NMS.

In the foregoing VPN implementation, a Network Management System (NMS) 150 may be used to monitor and control devices within the network. In an embodiment, NMS 150 is communicatively coupled to one of the routers in provider network 128, such as router 126. An administrator or technician uses NMS 150 to monitor and control devices within the network. A typical NMS 150 manages network infrastructure elements such as routers 118-126, which are also denoted Managed Devices 151. FIG. 4 is a block diagram of an example software architecture of an example NMS 150 that comprises one or more Agents 152 that implement Management Protocols or other functions, and, one or more Managed Objects 154 in a Management Information Base (MIB) 156. Managed Devices 151 may comprise routers 122, 124, 126, or computers, routers, terminal servers, printers or any other devices that are connected to networks.

Agents 152 are software modules hosted in NMS 150 that implement network management protocols such as SNMP. Agents 152 also may reside in and be executed by Managed Devices 151. For example, router 122 may comprise an SNMP agent that collects and stores management information for retrieval by NMS 150. Example management information includes the number of dropped packets that a Managed Device processes.

A Managed Object is a characteristic of a Managed Device. Examples include device identifier, operating system version, interface configuration attributes, etc. In an embodiment, each Managed Object may have one or more Object Instances represented in MIB 156. Object Instances are variable values related to a particular, device. For example, a list of currently active TCP circuits in a particular host is a Managed Object while a single active TCP circuit in a particular host computer is an Object Instance. Managed Objects can comprise scalar values that define a single object instance or tables that define multiple, related instances.

A MIB 156 is a collection of Managed Objects residing in a virtual information store. Collections of related Managed Objects are defined in specific MIB modules.

NMS 150 may also execute one or more management applications 157 that monitor and control Managed Devices. NMS 150 may comprise a workstation or other computer platform. At least one NMS 150 is present in a managed environment such as provider network 128.

A Management Protocol is used to convey management information between Agents 152 on Managed Devices and NMS 150. An example of a Management Protocol is Simple Network Management Protocol (SNMP). SNMPv1 is described in Request For Comment ("RFC") 1155, RFC 1157, and RFC 1212. In SNMPv1, messages comprise Protocol Data Units (PDUs). Messages are communicated between SNMP entities, and such entities may comprise application entities and protocol entities. SNMPv1 also includes an authentication service supporting one or more authentication schemes. SNMPv1 further defines access control techniques based on a SNMP MIB View.

SNMPv2 is derived from SNMPv1 and is described in RFC 2578, RFC 2579, RFC 2580, RFC 1905, RFC 1906, and RFC 1907. SNMPv2 has no message definition. SNMPv2 defines increased security capabilities. Community-Based SNMP Version 2 (SNMPv2c) is described in RFC 1901. SNMPv2c has a message format that is similar to the SNMPv1 message format. SNMPv3 is described above.

2.0 Structural and Functional Overview 2.1 General Overview

The present invention comprises, in one aspect, a method of discovering a network service topology for a multiprotocol label switching based virtual private network. In one embodiment, a method comprises determining and storing in a table, for all nodes within a VPN, one or more link pairs, wherein a link pair indicates a logical connection between a first site and a second site within the VPN. Next, the method involves creating a set of VPN objects based on an association between a first VPN object and the one or more link pairs stored in the table, wherein a VPN object indicates connectivity between a subset of sites from a plurality of sites within the VPN. Then a topology location is determined for a first VPN object from the set of VPN objects based on a set of rules applied to the subset of sites within the first VPN object.

In an embodiment, discovering a network service topology of a virtual private network (VPN) that uses multiprotocol label switching (MPLS) comprises receiving route target values from a virtual private network (VPN) route forwarding table (VRF table) of a networking device; determining and storing in a table one or more link pairs based on the route target values, wherein each of the link pairs indicates a connection between a first site and a second site within the VPN; creating a set of VPN objects based on an association between a first VPN object and the one or more link pairs stored in the table, wherein each of the VPN objects includes information indicating connectivity between a subset of sites from a plurality of sites within the VPN; and determining the topology for the first VPN object based on applying one or more topology rules to the subset of sites within the first VPN object.

In an embodiment, a comprehensive and scalable method to discover the MPLS VPN services from a network is provided. The method is comprehensive because it effectively identifies all MPLS VPN nodes and topological locations for the nodes. The method is scalable because it is effective for networks having large numbers of nodes.

According to one embodiment, an analysis of route target values in a VRF of a router is performed to derive information identifying network links. Grouping the links in particular ways identifies independent VPNs. Applying a set of device model rules to the identified VPNs enables a complete discovery of the MPLS VPN topology.

According to one embodiment, a three-pass method is used. The first pass analyzes information identifying imported and exported route targets in the VRFs of network routers, and creates a link table. Each entry in the link table represents a link between two sites that are logically connected through the route targets. The second pass extracts a set of independent VPNs from the link table. The VPNs are independent in the sense that they do not communicate with each other. The third pass analyzes each independent VPN using specific device models with device configuration to determine whether the topology is full-mesh, hub-and-spoke, or partial mesh.

Thus, embodiments herein implement the recognition that analysis of route target values in a VRF can derive network links, grouping the links in specified ways can identify independent VPNs, and applying rules to the VPNs can determine the MPLS VPN topology.

Referring again to FIG. 4, in an embodiment, NMS 150 comprises MPLS VPN Discovery Logic 402, which comprises a plurality of functional units that implement the functions provided herein. Logic 402 and each functional unit therein may comprise hardware logic or one or more software modules or a combination thereof. A VRF route target analysis unit 404 is coupled to a VPN extraction unit 406 and a device model analysis unit 408. The VRF route target analysis unit 404 and VPN extraction unit 406 are coupled to and manage a link table 410. The device model analysis unit 408 is coupled to a device model 412 and a service model 414.

Link table 410, device model 412 and service model 414 may be stored in main memory, persistent storage, MIB 156, or other storage.

2.2 Device Model and Service Model

A device model represents entities on a networking device pertaining to the physical and logical configuration of the networking device. An embodiment can implement a device model using programmatic objects and relationships that are established through execution of one or more object-oriented computer programs and defined in object-oriented classes. Associations between the device model classes simulate relationships between the corresponding entities on the device. A service model represents services that a device implements or that run between one or more devices. The entities modeled in the service are logical and are derived from the device model entities.

In an embodiment, device model 412 represents an inventory of networking devices in network 128, such as routers 118-126 and configuration information of such devices that relates to MPLS VPN service, such as the number and contents of VRF, including route targets. In an embodiment, the device model 412 is established or populated with device configuration information for devices in network 128 before using the VPN discovery approaches herein. Provider Edge (PE) roles of the devices 118, 120 are identified to the NMS system.

The service model 414 represents the MPLS VPN services that the devices in network 128 implement. For example, service model 414 represents the sites in one or more VPNs, their topology, provider edge device roles, customer site identifiers, routing protocol, redistribution parameters, etc. In one embodiment, the method for determining a MPLS VPN network topology uses the device model 412 as input and creates the service model 414 as output.

2.3 Service Provider Network Configurations

Figure 2:
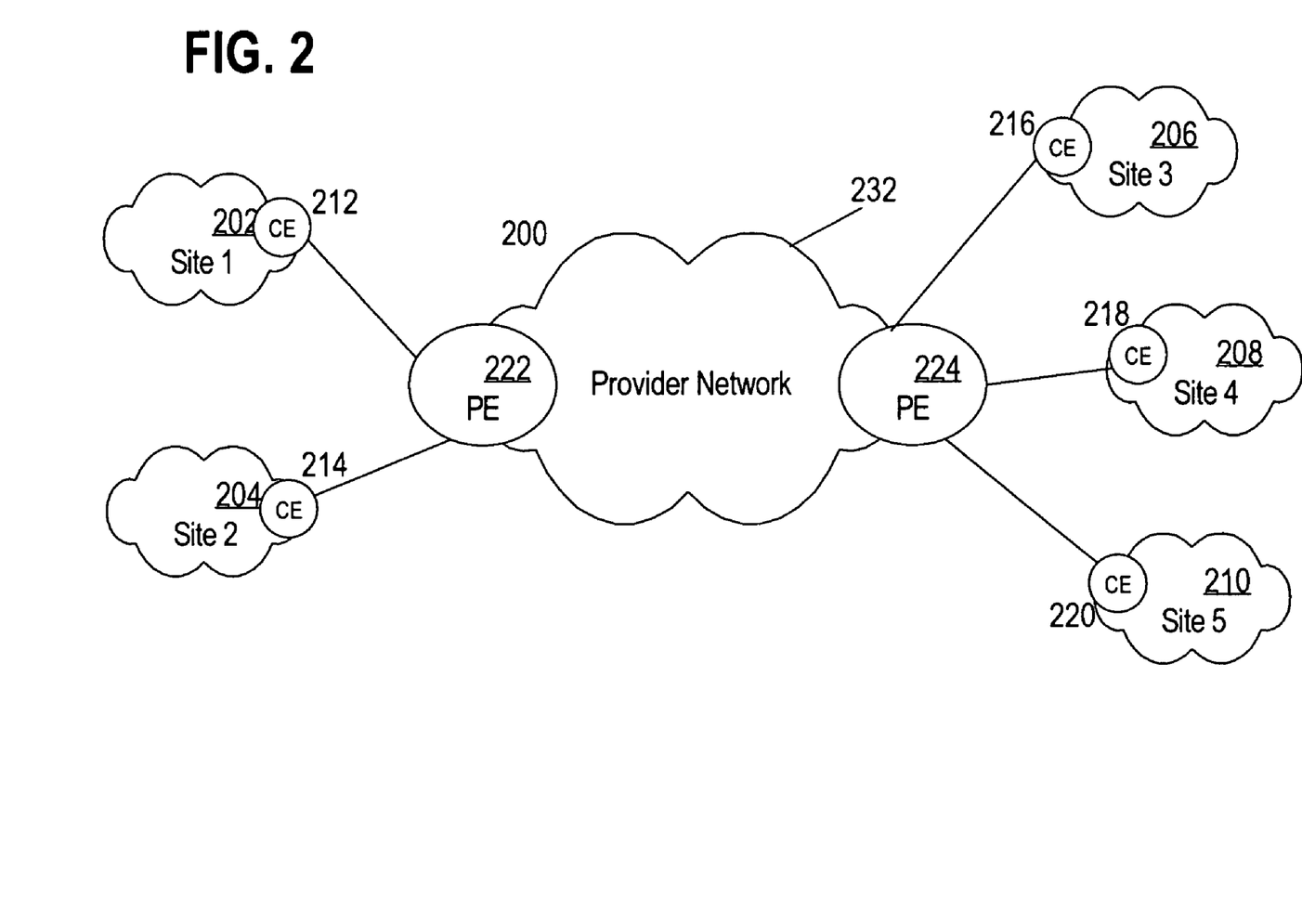
FIG. 2 is simplified block diagram of a Service Provider Virtual Private Network configuration.

FIG. 2 illustrates an example SP network. SP network 200 comprises PE devices 222, 224 interconnected through an IP/MPLS core network 232. One or more customer networks or sites 202, 204, 206, 208, 210 are connected to the provider's network by CE devices 212, 214, 216, 218, and 220 that connects to the PE devices 222, 224. Multiple sites of a customer can be connected to one or more PE devices. For example, both sites 202, 204 are connected to PE device 222.

Once physical connectivity is established between customer sites 202, 204, 206, 208, 210 and PE devices 222, 224, the SPs logically interconnect the customer sites by applying MPLS VPN configuration on the PE devices. In an embodiment, VRF, route targets and Multi-Protocol BGP commands are used to establish the MPLS VPN configuration.

In various embodiments sites 202, 204, 206, 208, 210 are connected to each other through either a full mesh, a hub & spoke or a partial mesh topology.

For each customer site 202, 204, 206, 208, 210 that is connected to one of the PE devices, 222, 224 a VRF table is maintained. As illustrated in FIG. 2, PE device 222 maintains VRF tables 234, 236 for the corresponding connected customer sites 202, 204. Similarly, PE device 224 maintains VRF tables 238, 240, 242 for customer sites 206, 208, 210, respectively. Route targets associated with end stations in the customer sites are configured and maintained within the VRFs.

Figure 3:
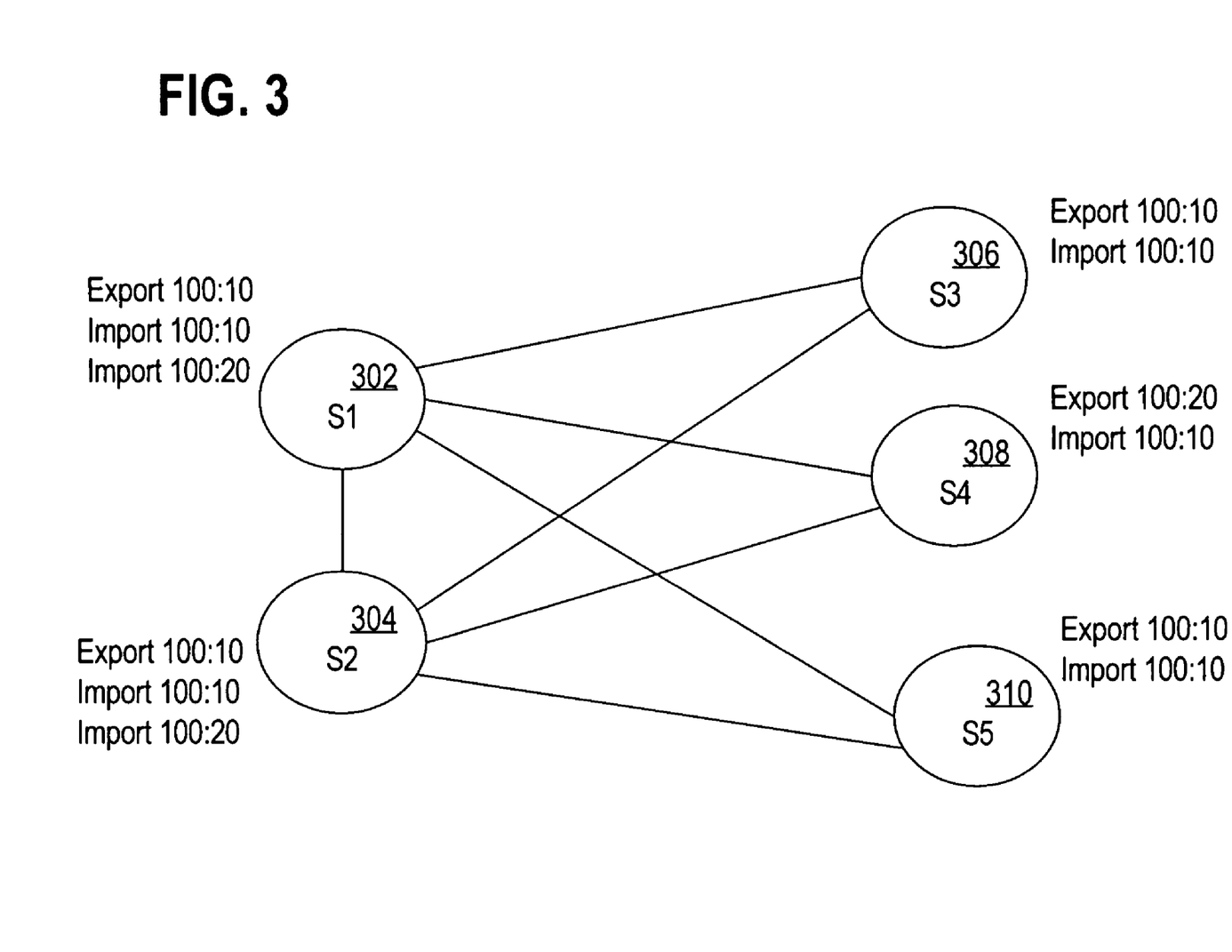
FIG. 3 is a block diagram of a Hub and Spoke topology with dual hub sites.

FIG. 3 is an example of a Hub and Spoke topology with dual hub sites S1 302 and S2 304. FIG. 3 illustrates five sites 302, 304, 306, 308, 310, which are also denoted S1-S5, respectively. Site 302 exports route target values 100:10 and imports route target values 100:10 and 100:20. Site 304 exports 100:10 and imports 100:10 and 100:20. Site 306 exports 100:20 and imports 100:10. Site 308 exports 100:20, imports 100:10, S5 310 exports 100:20, and imports 100:10.

2.4 Discovering a MPLS VPN Topology

In an embodiment, a NMS discovers the topology of FIG. 2 based on analyzing route targets configured in VRFs to determine VPN connectivity among the sites. In an embodiment, analyzing the route target information that is imported into or exported from each VRF 234, 236, 238, 240, 242 table on PE devices 222, 224 provides a basis for deriving the SP network topology. Analysis of route targets contained in VRF 238, 240, 242, 244 on PE 218 and 220 results in creating a link table containing all pairs of route-target links in the network, in which each pair indicates a connection between the two sites.

Figure 5:
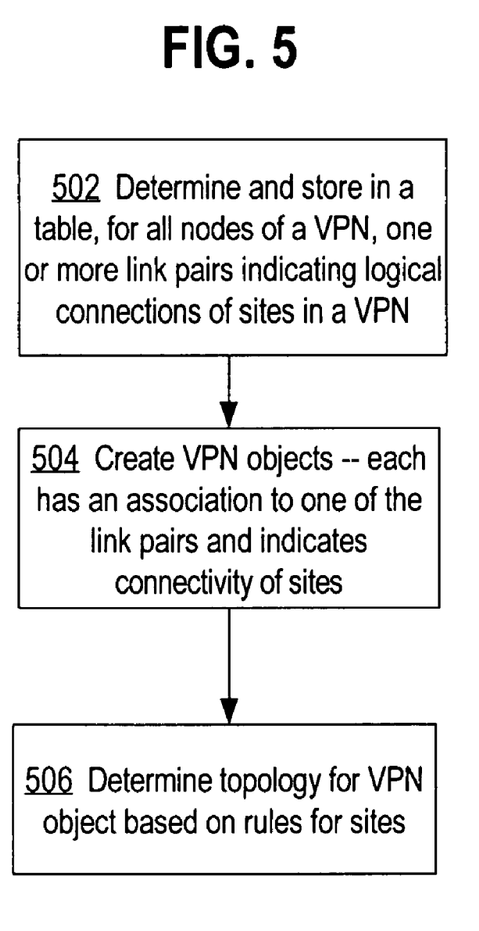
FIG. 5 is a flow diagram of one embodiment of a method of discovering an MPLS VPN topology.

FIG. 5 is a flow diagram of one embodiment of a method of discovering an MPLS VPN topology. In step 502, the method determines and stores in a table, for all nodes of a VPN, one or more link pairs indicating logical connections of sites in a network. In step 504, one or more VPN objects are created, in which each object represents an association to one of the link pairs and indicates connectivity of sites. In step 506, the topology for the VPN object is determined based upon rules applicable to different kinds of sites.

Figure 6A:
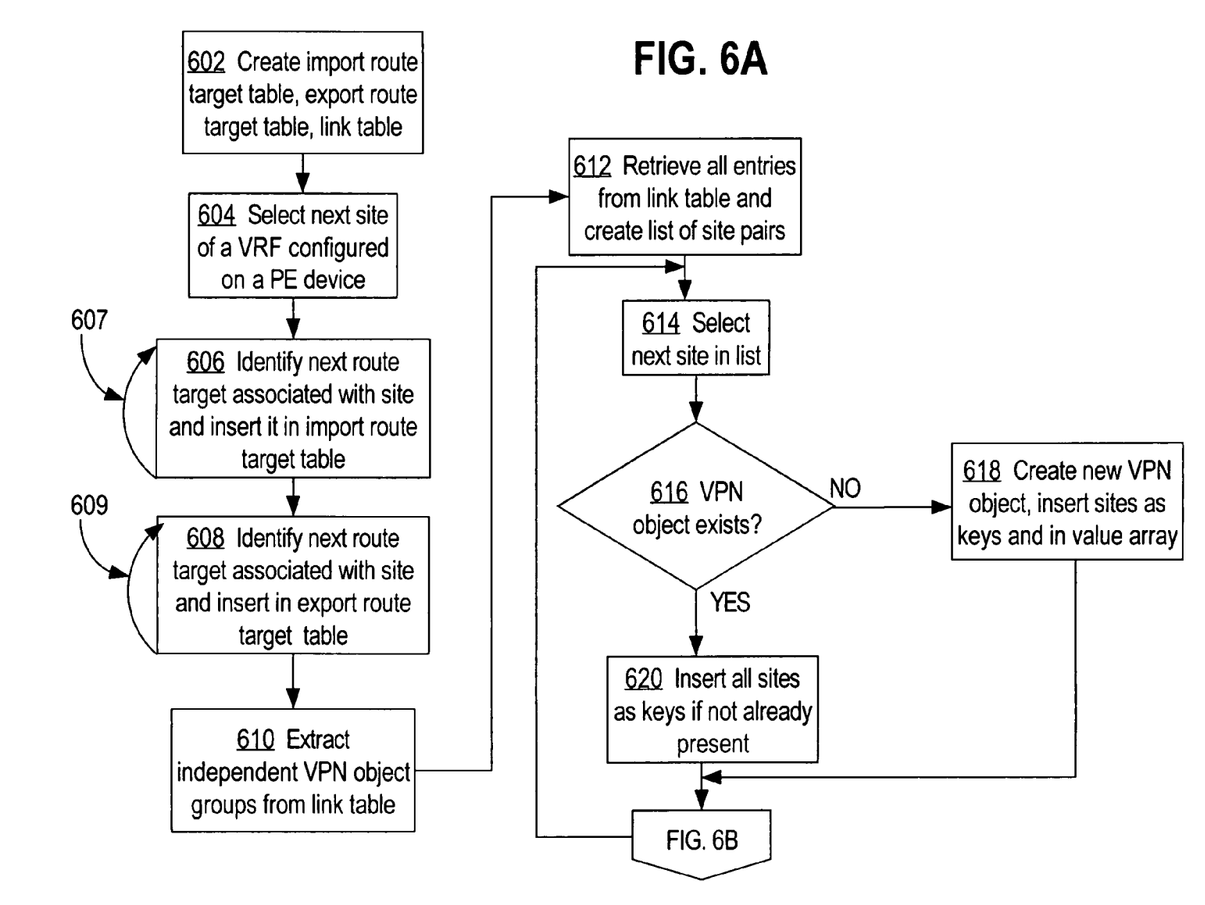
FIG. 6A and FIG. 6B are flow diagrams of another embodiment of a method of discovering an MPLS VPN topology.
Figure 6B:
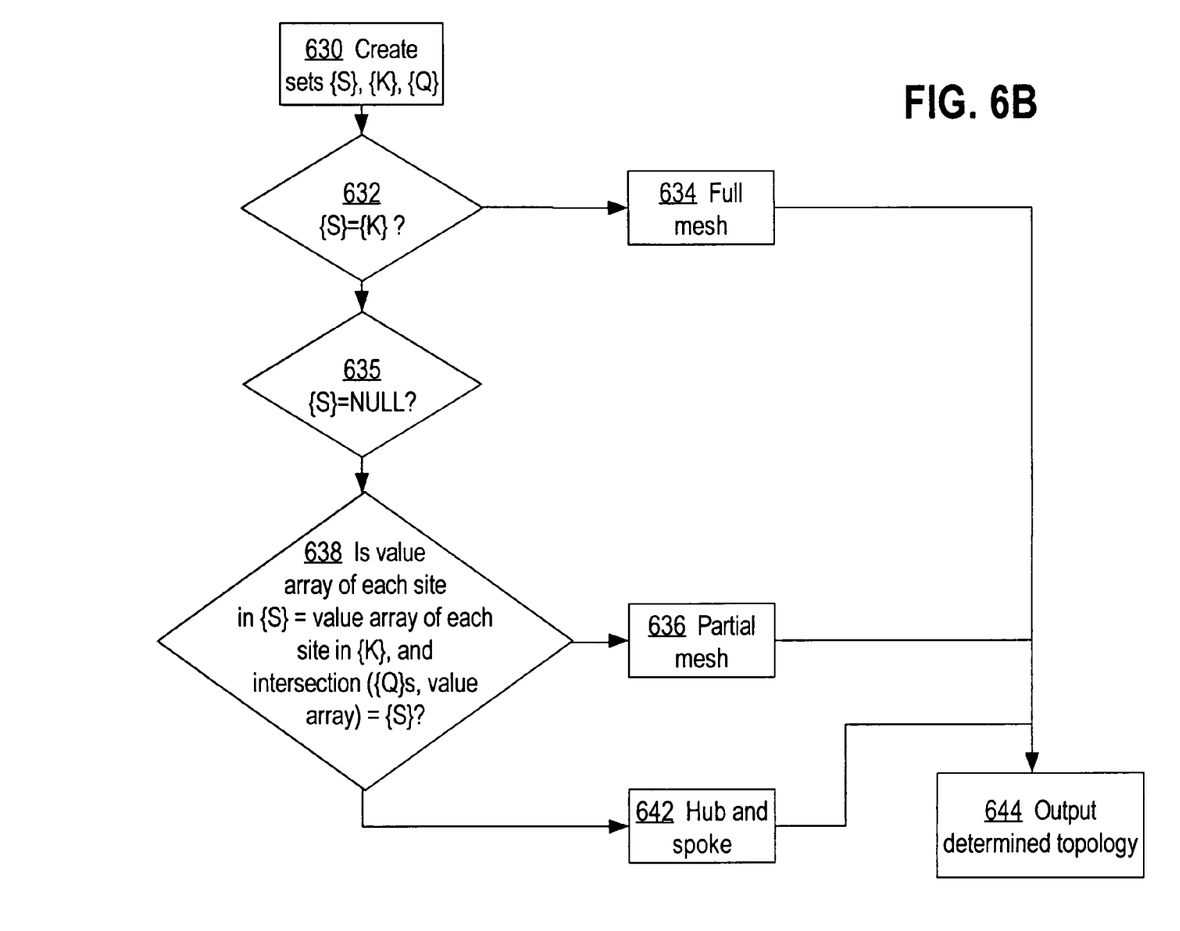

FIG. 6A and FIG. 6B are flow diagrams of another embodiment of a method of discovering an MPLS VPN topology. Referring first to FIG. 6A, in step 602, an import route target table, export route target table, and link table are created and stored. In the embodiment of FIG. 4, step 602 involves creating and storing link table 410, import route target table 416, and export route target table 418 in NMS 150. In an embodiment, import route target table 416 table contains the route target value imported into the VRF, for each site. Export route target table 418 table contains the route target value exported from the VRF, for each site. Link table 410 contains the information identifying a route-target link between two sites. An entry into the table means two sites are connected. TABLE A presents an example embodiment of columns of link table 410.

TABLE A

EXAMPLE LINK TABLE

| aSite | zSite | Bidirectional (default false) |
| --- | --- | --- |

In an embodiment, an entry in the Link table 410 means there is VPN connectivity from the site identified in the aSite column to the site identified in the zSite column. In an embodiment, an 'aSite' exports a route target that the 'zSite' imports. The 'bidirectional' column stores a Boolean attribute that indicates whether connectivity among the aSite and zSite is bidirectional. If the 'bidirectional' column for an entry is true, then both the aSite and zSite import the route target exported by each other.

Referring again to FIG. 6A, in step 604, a next site of a VRF configured on a PE device is selected. Step 604 may involve an NMS performing the sub steps of retrieving, from an device inventory database, a device identifier of a PE device, and issuing a query to that PE device to return a site identified in a VRF configured on the device. Step 604 is a first step in a loop of FIG. 6A with which values are populated in the tables 410, 416, 418 as the method iterates through every PE device. For each PE device, the VRF and route target configurations are analyzed.

In step 606, for all imported route-target values, the next route target value for the site is identified and inserted into the import route target table 416. In an embodiment, step 416 involves inserting a (route-target, zSite) entry into the import route target table 416. If the same route-target is also present in export route target table 418 in association with a site named aSite, then an entry for (aSite, zSite) is created in the link table 410, indicating that the sites are linked. Further, if the converse tuple (zSite, aSite) is already present in link table 410, then the bidirectional column is set to true; otherwise, an entry (aSite, zSite, false) is added to the link table 410. As arrow 607 indicates, step 606 is repeated for all route targets for the site In step 608 and as indicated by arrow 609, for all exported route-target values information is inserted into the export route target table 418. In embodiment, step 608 involves inserting a (route-target, aSite) entry into Export route target table 418. If the same route-target value is also present in the import route target table 416 (in an entry with the site named aSite), then a tuple (aSite, zSite) is created in the link table 410. If the converse tuple (zSite, aSite) is already present in the link table 410, then the bidirectional column is set to true. Otherwise, an entry (aSite, zSite, false) is inserted into the link table 410.

At the end of these steps, the link table 410 is populated with a list of link pairs, in which each entry identifies two sites that are connected to one another in the VPN as indicated in import and export route target. Thus, the present approach infers the existence of a connection based on the route target values to create route-target links in link table 410. For the example topology of FIG. 3, applying the method of FIG. 6A thus far results in creating the link table of TABLE B.

TABLE B

EXAMPLE LINK TABLE

| aSite | zSite | Bidirectional |
| --- | --- | --- |
| S1 | S2 | True |
| S1 | S3 | True |
| S1 | S4 | True |
| S1 | S5 | True |
| S2 | S3 | True |
| S2 | S4 | True |
| S2 | S5 | True |

At step 610, a second pass over the data is initiated to identify independent MPLS VPNs. Generally, the second pass extracts VPN objects from route-target links in the link table 410 by grouping sites in the link table entries into a VPN if at least one site already belongs to the VPN object. In addition, while grouping is performed, information is stored identifying the connectivity of each site with other sites.

In steps 612 to 620, the link table 410 generated in preceding steps is analyzed and one or more independent VPN object groups are extracted. For each VPN object group, site connectivity information is identified and stored. In an embodiment, route-target link information, which the first pass populated in the link table 410, is evaluated to extract a set of independent VPN objects representing one or more sites that are connected to each other. In an embodiment, extracting VPN objects from route-target links (from link table 410) involves grouping sites listed in the link table 410 into a group where at least one site already belongs to a particular VPN object. While performing the grouping feature, the connectivity of each site, with the other sites, is stored.

Referring again to FIG. 6A, in an embodiment generating the VPN object groups involves the following steps, which are performed for every site (S) in the link table 410. In step 612, all entries are retrieved from the link table 410, where site S is either in aSite or zSite column. As a result, 'n' number of site pairs of (aSite, zSite) are retrieved and stored in a list that is denoted L herein. Labels used herein such as S, n, L, etc., are selected and used purely for convenience and clarity but are not required for use in an embodiment or implementation.

In step 614, a next site in the list L is selected. Thus, step 614 is a first step in a loop that iterates through each site $S_1$ in list L. In step 616, a test checks whether a VPN Object exists. In an embodiment, a VPN Object is implemented in an object-oriented programming language, as a hashmap in which the key is $S_1$ and the value is an array of sites that are connected to the key site $S_1$. Thus, all the sites in the list L are keys for only one VPN Object. Implementations may use C++, JAVA®, etc.

If no VPN Object is found, then in step 618, a new VPN Object is created and all sites in list L are inserted as keys. For key site S1 in the map, all the sites in L are inserted into the value array, such that all sites in the value array are connected to site S1 (key). If a VPN Object is found at step 616, then at step 620 all sites in list L are inserted as a key in the VPN Object, if they have not already been inserted. Additionally, all the sites in list L are added into the value array corresponding to the key site S1.

As a result of the second pass, one or more VPN objects is created, and each VPN object represents a MPLS VPN that is completely independent and does not connect with any other MPLS VPN. For the example topology of FIG. 3, as an example, the following VPN Object would be created:

VPN Object1:
Key Value Array
S1→S1, S2, S3, S4, S5
S2→S2, S1, S3, S4, S5
S3→S3, S1, S2
S4→S4, S1, S2
S5→S5, S1, S2

Referring now to FIG. 6B, in a third pass of an embodiment, each VPN object group is analyzed and, using the site connectivity information, the topology of each VPN object group is determined. In an embodiment, the topology of each VPN object can be determined as full mesh, hub & spoke or partial mesh. In an embodiment, set operations are performed on sets based on the VPN Objects to determine the topology of each VPN Object. In an embodiment, at step 630 the following sets are defined.

Let Set {K} be the set of all key values in the VPN Object hashmap.

Let Set {S} be the intersection of all value array sets in the hashmap, where the value array of each key in the hashmap is considered a set.

Let Set {Q} be all sites that are there in set {K} but not in set {S}.

In an embodiment, for each VPN Object, steps 632 to 644 are performed. If set {S} is identical to set {K}, as tested in step 632, then the VPN Object represents a full mesh topology, as shown in step 634. If the set {S} is null, as tested in step 635, then the topology is partial mesh, as shown in step 636. Otherwise, either the set {S} is a hub and spoke topology, or a partial mesh topology, and further analysis is performed.

In an embodiment, in step 638, if the topology is a hub and spoke topology then the set corresponding to value array of each site in {S} is identical to set {K} and for set {Q}, the intersection operation of each site in set {Q} and its corresponding value array set is identical to set {S}. If the preceding two conditions are not satisfied, then VPN Object has partial mesh topology, as shown at step 636; otherwise, the topology is hub and spoke, as shown at step 642.

In step 644, the topology determined in preceding steps is output. The output operation may comprise updating an NMS database, sending a message to an application or system, displaying a message to an operator or administrator, or any other suitable output operation. In an embodiment, the service model 414 (FIG. 4) is updated by storing information identifying the determined topology in association with the VPN object. As a result, NMS 150 can manage MPLS VPN services that are deployed in the network as if the NMS had initially configured the services.

Applying the process of FIG. 6B to the example topology in FIG. 3, the following set operations are performed in order to determine the network topology:

Let Set {K}={S1, S2, S3, S4, S5}. Let the Value Array sets be: For key site S1: {S1, S2, S3, S4, S5}. For key site S2: {S2, S1, S3, S4, S5}. For key site S3: {S3, S1, S2}. For key site S4: {S4, S1, S2}. For key site S5: {S5, S1, S2}.

The intersection of the value array sets of {S}={S1, S2}. {S} is not identical to {K}, so it is not full mesh topology. The value set for each element in {S} should be identical to {K}. For S1, value array set is {S1, S2, S3, S4, S5} which is identical to set {K}. For S2, value array set is {S2, S1, S3, S4, S5}, which is identical to set {K}. Therefore, every site (including itself) is connected to sites S1 and S2. Accordingly, potentially S1 and S2 are hub sites. The process then verifies if the rest of the sites only connect to hub sites and not to any other sites.

Let Set {Q}=sites that are there in {K} but not in {S}. Therefore, {Q}={S1, S2, S3, S4, S5}−{S1, S2}={S3, S4, S5}. For every element in set Q, {S3} intersection with its value array set {S3, S1, S2}={S1, S2}; {S4} intersection with its value array set {S4, S1, S2}={S1, S2}; and {S5} intersection with its value array set {S5, S1, S2}={S1, S2}.

Accordingly, sites S3, S4, and S5 are all connected to hub sites S1 and S2 as determined earlier. Therefore, the VPN object represents a hub and spoke topology with dual hub sites S1 and S2.

The process illustrated in flow diagram form in FIG. 6A, FIG. 6B may be implemented in electronic logic as part of VPN extraction unit 406, or as one or more computer programs or other software elements that form the VPN extraction unit or other units of MPLS VPN discovery logic 402 of FIG. 4.

3.0 Hardware Overview

Figure 7:
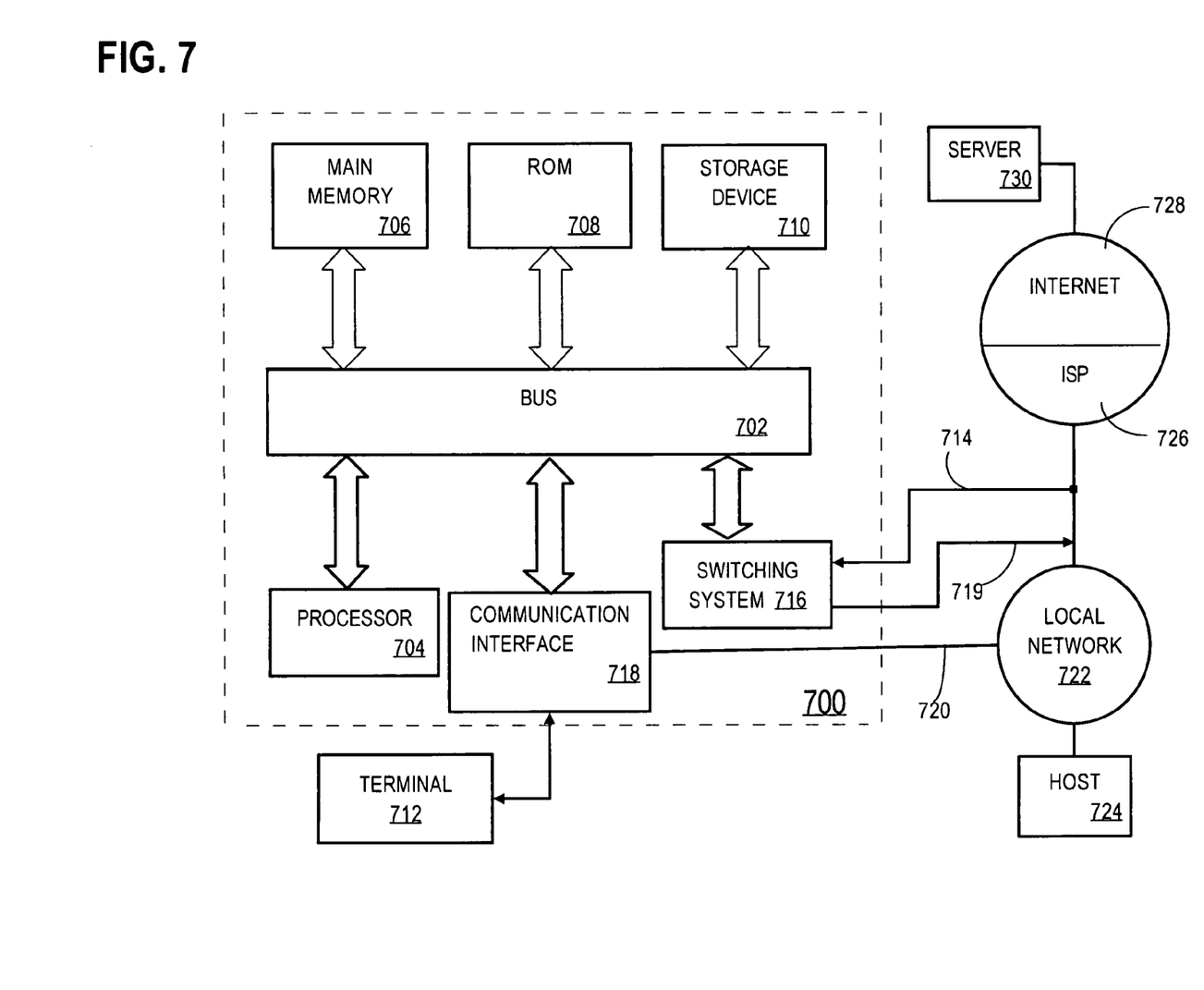
FIG. 7 is a block diagram that illustrates a computer system upon which an embodiment may be implemented.

FIG. 7 is a block diagram that illustrates a computer system 700 upon which an embodiment of the invention may be implemented. The preferred embodiment is implemented using one or more computer programs running on a network element such as a router device. Thus, in this embodiment, the computer system 700 is a router.

Computer system 700 includes a bus 702 or other communication mechanism for communicating information, and a processor 704 coupled with bus 702 for processing information. Computer system 700 also includes a main memory 706, such as a random access memory (RAM), flash memory, or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk, flash memory, or optical disk, is provided and coupled to bus 702 for storing information and instructions.

A communication interface 718 may be coupled to bus 702 for communicating information and command selections to processor 704. Interface 718 is a conventional serial interface such as an RS-232 or RS-422 interface. An external terminal 712 or other computer system connects to the computer system 700 and provides commands to it using the interface 714. Firmware or software running in the computer system 700 provides a terminal interface or character-based command interface so that external commands can be given to the computer system.

A switching system 716 is coupled to bus 702 and has an input interface 714 and an output interface 719 to one or more external network elements. The external network elements may include a local network 722 coupled to one or more hosts 724, or a global network such as Network 728 having one or more servers 730. The switching system 716 switches information traffic arriving on input interface 714 to output interface 719 according to pre-determined protocols and conventions that are well known. For example, switching system 716, in cooperation with processor 704, can determine a destination of a packet of data arriving on input interface 714 and send it to the correct destination using output interface 719. The destinations may include host 724, server 730, other end stations, or other routing and switching devices in local network 722 or Network 728.

The invention is related to the use of computer system 700 for providing a virtual private network using simple network management protocol. According to one embodiment of the invention, a virtual private network using simple network management protocol is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire, and fiber optics, including the wires that comprise bus 702.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Communication interface 718 also provides a two-way data communication coupling to a network link 720 that is communicatively coupled to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Network Service Provider (ISP) 726. ISP 726 in turn provides data communication services through the worldwide packet data communication network now commonly referred to as the "Internet" 728. Local network 722 and Network 728 both use electrical, electromagnetic, or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720, and communication interface 718. In the Network example, a server 730 might transmit a requested code for an application program through Network 728, ISP 726, local network 722, and communication interface 718. In accordance with the invention, one such downloaded application provides for a virtual private network using simple network management protocol as described herein.

The received code may be executed by processor 704 as it is received, and/or stored in storage device 710, or other non-volatile storage for later execution. In this manner, computer system 700 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A machine-implemented method of discovering a network service topology, comprising:

receiving a plurality of route target values from a virtual private network (VPN) route forwarding table (VRF table) of a networking device;

determining and storing in a table one or more link pairs that are determined based on the route target values, wherein each of the link pairs indicates a logical connection between a first site and a second site within the VPN;

creating a set of VPN objects based on an association between a first VPN object and the one or more link pairs stored in the table, wherein each of the VPN objects includes information indicating connectivity between a subset of sites from a plurality of sites within the VPN; and determining the topology for the first VPN object based on applying one or more topology rules to the subset of sites within the first VPN object.

2. A method as recited in claim 1, wherein determining and storing link pairs further comprises determining a first link pair based on a route target entry m a corresponding VRF table of a switch of a network.

3. A method as recited in claim 2, wherein the route target entry corresponds to a route target value imported into the corresponding VRF table for the first site.

4. A method as recited in claim 2, wherein the route target entry corresponds to a route target value exported from the corresponding VRF table for the first site.

5. A method as recited in claim 1, further comprising:
inserting a first route-target information into a first table for all imported route-target values within a VRF;
determining if the first route-target information is contained in a second table; and
creating and inserting into a third table, a first link pair when the first route-target information is also contained in the second table and the first link pair does not already exist in the table, and otherwise setting a marker indicating said first link pair is bidirectional.

6. A method as recited in claim 1, further comprising:
inserting a first route-target information into a first table for all export route-target values within a VRF;
determining if the first route-target information is contained in a second table; and
creating and inserting into a third table, a first link pair when the first route-target information is also contained in the second table and the first link pair does not already exist, and otherwise setting a marker indicating said first link pair is bidirectional.

7. A method as recited in claim 1, further comprising storing, for the subset of sites from the plurality of sites within the VPN, connectivity information associated with each of the sites within the subset of sites.

8. A method as recited in claim 1 wherein creating a set of VPN objects further comprises:
determining, for the first site within one or more link pairs retrieved from the table, whether a VPN object is associated with the first site;
creating a new VPN object when no VPN object is associated with the first site; and
inserting all sites associated with the first site into the VPN object.

9. A method as recited in claim 1, wherein a VPN object is a hashmap in which a key comprises information representing a first site and a value comprises information representing a plurality of sites connected to the first site.

10. A method as recited in claim 1, wherein one of the topology rules specifies that the topology of the VPN object is a full mesh topology when a first specified subset of sites equals the subset of sites within the first VPN object.

11. The method of claim 10, wherein the first specified subset of sites comprises all key values in a plurality of hashmaps associated with the set of VPN objects.

12. The method of claim 1, wherein the subset of sites within the first VPN object comprises sites that are connected to the first VPN object.

13. A method as recited in claim 1 wherein one of the topology rules specifies that the topology of the VPN object is a partial mesh topology when the subset of sites within the first VPN object is null.

14. A method as recited in claim 1, wherein one of the topology rules specifies that the topology of the VPN object is a hub and spoke topology when a first specified subset of sites equals the subset of sites within the first VPN object and when an intersection of a second specified subset of sites equals the subset of sites within the first VPN object.

15. The method of claim 14 wherein the second specified subset of sites comprises all sites that are not key values within a plurality of hashmaps associated with the set of VPN objects but not contained in the subset of sites within the first VPN Object.

16. A computer-readable tangible medium storing instructions which, when executed by one or more processors, cause performing:
receiving a plurality of route target values from a virtual private network (VPN) route forwarding table (VRF table) of a networking device;
determining and storing in a table one or more link pairs that are determined based on the route target values, wherein each of the link pairs indicates a logical connection between a first site and a second site within the VPN;
creating a set of VPN objects based on an association between a first VPN object and the one or more link pairs stored in the table, wherein each of the VPN objects includes information indicating connectivity between a subset of sites from a plurality of sites within the VPN; and
determining the topology for the first VPN object based on applying one or more topology rules to the subset of sites within the first VPN object.

17. An apparatus, comprising:
one or more processors;
one or more network interfaces communicatively coupled to the processors and a network;
a computer-readable tangible storage medium coupled to the one or more processors and carrying instructions which, when executed by the one or more processors, cause performing:
receiving a plurality of route target values from a virtual private network (VPN) route forwarding table (VRF table) of a networking device;
determining and storing in a table one or more link pairs that are determined based on the route target values, wherein each of the link pairs indicates a logical connection between a first site and a second site within the VPN;
creating a set of VPN objects based on an association between a first VPN object and the one or more link pairs stored in the table, wherein each of the VPN objects includes information indicating connectivity between a subset of sites from a plurality of sites within the VPN; and
determining the topology for the first VPN object based on applying one or more topology rules to the subset of sites within the first VPN object.

18. The apparatus of claim 17, wherein the instructions for determining and storing link pairs further comprise instructions which when executed cause determining a first link pair based on a route target entry in a corresponding VRF table of a switch of a network.

19. The apparatus of claim 18, wherein the route target entry corresponds to a route target value imported into the corresponding VRF table for the first site.

20. The apparatus of claim 18, wherein the route target entry corresponds to a route target value exported from the corresponding VRF table for the first site.

21. The apparatus of claim 17, further comprising instructions which when executed cause:
inserting a first route-target information into a first table for all imported route- target values within a VRF;
determining if the first route-target information is contained in a second table; and
creating and inserting into a third table, a first link pair when the first route-target information is also contained in the second table and the first link pair does not already exist in the table, and otherwise setting a marker indicating said first link pair is bidirectional.

22. The apparatus of claim 17, further comprising instructions which when executed cause:
inserting a first route-target information into a first table for all export route-target values within a VRF;
determining if the first route-target information is contained in a second table; and
creating and inserting into a third table, a first link pair when the first route-target information is also contained in the second table and the first link pair does not already exist, and otherwise setting a marker indicating said first link pair is bidirectional.

23. The apparatus of claim 17, further comprising instructions which when executed cause storing, for the subset of sites from the plurality of sites within the VPN, connectivity information associated with each of the sites within the subset of sites.

24. The apparatus of claim 17 wherein the instructions for creating a set of VPN objects further comprise instructions which when executed cause:
determining, for the first site within one or more link pairs retrieved from the table, whether a VPN object is associated with the first site;
creating a new VPN object when no VPN object is associated with the first site; and
inserting all sites associated with the first site into the VPN object.

25. The apparatus of claim 17, wherein a VPN object is a hashmap in which a key comprises information representing a first site and a value comprises information representing a plurality of sites connected to the first site.

26. The apparatus of claim 17, wherein one of the topology rules specifies that the topology of the VPN object is a full mesh topology when a first specified subset of sites equals the subset of sites within the first VPN object.

27. The apparatus of claim 26, wherein the first specified subset of sites comprises all key values in a plurality of hashmaps associated with the set of VPN objects.

28. The apparatus of claim 17, wherein the subset of sites within the first VPN object comprises sites that are connected to the first VPN object.

29. The apparatus of claim 17 wherein one of the topology rules specifies that the topology of the VPN object is a partial mesh topology when the subset of sites within the first VPN object is null.

30. The apparatus of claim 17, wherein one of the topology rules specifies that the topology of the VPN object is a hub and spoke topology when a first specified subset of sites equals the subset of sites within the first VPN object and when an intersection of a second specified subset of sites equals the subset of sites within the first VPN object.

31. An apparatus for discovering a network service topology, comprising:
means for receiving a plurality of route target values from a virtual private network (VPN) route forwarding table (VRF table) of a networking device;
means for determining and storing in a table one or more link pairs that are determined based on the route target values, wherein each of the link pairs indicates a logical connection between a first site and a second site within the VPN;
means for creating a set of VPN objects based on an association between a first VPN object and the one or more link pairs stored in the table, wherein each of the VPN objects includes information indicating connectivity between a subset of sites from a plurality of sites within the VPN; and
means for determining the topology for the first VPN object based on applying one or more topology rules to the subset of sites within the first VPN object.

32. The apparatus of claim 31, wherein the means for determining and storing link pairs further comprises means for determining a first link pair based on a route target entry m a corresponding VRF table of a switch of a network.

33. The apparatus of claim 32, wherein the route target entry corresponds to a route target value imported into the corresponding VRF table for the first site.

34. The apparatus of claim 32, wherein the route target entry corresponds to a route target value exported from the corresponding VRF table for the first site.

35. The apparatus of claim 31, further comprising:
means for inserting a first route-target information into a first table for all imported route-target values within a VRF;
means for determining if the first route-target information is contained in a second table; and
means for creating and inserting into a third table, a first link pair when the first route-target information is also contained in the second table and the first link pair does not already exist in the table, and otherwise setting a marker indicating said first link pair is bidirectional.

36. The apparatus of claim 31, further comprising:
means for inserting a first route-target information into a first table for all export route-target values within a VRF;
means for determining if the first route-target information is contained in a second table; and
means for creating and inserting into a third table, a first link pair when the first route-target information is also contained in the second table and the first link pair does not already exist, and otherwise setting a marker indicating said first link pair is bidirectional.

37. The apparatus of claim 31, further comprising means for storing, for the subset of sites from the plurality of sites within the VPN, connectivity information associated with each of the sites within the subset of sites.

38. The apparatus of claim 31 wherein the means for creating a set of VPN objects further comprises:
means for determining, for the first site within one or more link pairs retrieved from the table, whether a VPN object is associated with the first site;
means for creating a new VPN object when no VPN object is associated with the first site; and means for inserting all sites associated with the first site into the VPN object.

39. The apparatus of claim 31, wherein a VPN object is a hashmap in which a key comprises information representing a first site and a value comprises information representing a plurality of sites connected to the first site.

40. The apparatus of claim 31, wherein one of the topology rules specifies that the topology of the VPN object is a full mesh topology when a first specified subset of sites equals the subset of sites within the first VPN object.

41. The method of claim 40, wherein the first specified subset of sites comprises all key values in a plurality of hashmaps associated with the set of VPN objects.

42. The method of claim 31, wherein the subset of sites within the first VPN object comprises sites that are connected to the first VPN object.

43. The apparatus of claim 31 wherein one of the topology rules specifies that the topology of the VPN object is a partial mesh topology when the subset of sites within the first VPN object is null.

44. The apparatus of claim 31, wherein one of the topology rules specifies that the topology of the VPN object is a hub and spoke topology when a first specified subset of sites equals the subset of sites within the first VPN object and when an intersection of a second specified subset of sites equals the subset of sites within the first VPN object.

45. The method of claim 44 wherein the second specified subset of sites comprises all sites that are not key values within a plurality of hashmaps associated with the set of VPN objects but not contained in the subset of sites within the first VPN Object.

* * * * *

UNITED STATES PATENT AND TRADEMARK OFFICE
CERTIFICATE OF CORRECTION

PATENT NO. : 7,593,352 B2  Page 1 of 1
APPLICATION NO. : 11/446486
DATED : September 22, 2009
INVENTOR(S) : Alok Verma

It is certified that error appears in the above-identified patent and that said Letters Patent is hereby corrected as shown below:

At column 13
Claim 2: Line 15, delete "entry m" and insert --entry in--.

At column 16
Claim 32: Line 26, delete "entry m" and insert --entry in--.

Signed and Sealed this

Seventeenth Day of November, 2009

David J. Kappos
*Director of the United States Patent and Trademark Office*